(12) United States Patent
Nucci et al.

(10) Patent No.: US 10,048,942 B2
(45) Date of Patent: *Aug. 14, 2018

(54) SYSTEM AND METHOD FOR AUTOMATED ON-DEMAND CREATION OF A CUSTOMIZED SOFTWARE APPLICATION

(71) Applicant: Dell Products, LP, Round Rock, TX (US)

(72) Inventors: Richard C. Nucci, Wynnewood, PA (US); Mitchell Stewart, Malvern, PA (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/929,450

(22) Filed: Nov. 2, 2015

(65) Prior Publication Data

US 2016/0054980 A1 Feb. 25, 2016

Related U.S. Application Data

(63) Continuation of application No. 13/971,122, filed on Aug. 20, 2013, now Pat. No. 9,176,711, which is a continuation of application No. 12/110,607, filed on Apr. 28, 2008, now Pat. No. 8,533,661.

(60) Provisional application No. 60/914,484, filed on Apr. 27, 2007.

(51) Int. Cl.
*G06F 9/44* (2018.01)
*G06F 8/20* (2018.01)
*G06F 8/10* (2018.01)
*G06F 8/34* (2018.01)
*G06F 3/0482* (2013.01)

(52) U.S. Cl.
CPC .............. *G06F 8/20* (2013.01); *G06F 3/0482* (2013.01); *G06F 8/10* (2013.01); *G06F 8/34* (2013.01)

(58) Field of Classification Search
None
See application file for complete search history.

(56) References Cited

U.S. PATENT DOCUMENTS

| | | | | |
|---|---|---|---|---|
| 7,941,784 | B2 * | 5/2011 | Shenfield | G06F 9/445 717/107 |
| 8,015,541 | B1 * | 9/2011 | Srinivasan | G06F 8/20 717/104 |
| 8,590,011 | B1 * | 11/2013 | Legault | G06F 21/44 713/166 |
| 2003/0097286 | A1 * | 5/2003 | Skeen | G06Q 10/10 717/100 |

(Continued)

*Primary Examiner* — Daxin Wu
(74) *Attorney, Agent, or Firm* — Prol Intellectual Property Law, PLLC; H. Kenneth Prol

(57) ABSTRACT

A web-based interface is provided for visually modeling a business-to-business or application integration process by selecting and associating predetermined process-representing visual elements. A customized, enterprise-specific executable software application ("dynamic runtime engine") is automatedly produced by software running remotely. The dynamic runtime engine is created to include a generic application template, predefined "stock" codesets selected as a function of the modeled process, and a data profile codeset that includes input provided by the user for customizing the stock components for a specific integration process of a specific enterprise.

20 Claims, 5 Drawing Sheets

(56) References Cited

U.S. PATENT DOCUMENTS

| | | | | |
|---|---|---|---|---|
| 2005/0228517 A1* | 10/2005 | Tomita | ............... | G05B 19/0426 700/87 |
| 2007/0168464 A1* | 7/2007 | Noonan | ............ | G06F 17/30569 709/218 |
| 2011/0276439 A1* | 11/2011 | Ragusa | ............. | G06F 17/30994 705/27.2 |

* cited by examiner

SYSTEM AND METHOD FOR AUTOMATED ON-DEMAND CREATION OF A CUSTOMIZED SOFTWARE APPLICATION

CROSS-REFERENCE TO RELATED APPLICATION

This application is a continuation of U.S. patent application Ser. No. 13/971,122 entitled "System and Method for Automated On-Demand Creation of a Customized Software Application," filed on Aug. 20, 2013, which is a continuation of U.S. patent application Ser. No. 12/110,607 filed on Apr. 28, 2008, now U.S. Pat. No. 8,533,661, which claims the benefit of U.S. Provisional Patent Application No. 60/914,484 filed on Apr. 27, 2007, the disclosures of which are hereby expressly incorporated by reference in their entirety.

FIELD OF THE DISCLOSURE

The present disclosure relates generally to a system and method for automated, on-demand creation of a software application that is customized for a specific user's needs and/or computer network system, such as a customized business integration software application executable to exchange data between diverse computing systems.

DISCUSSION OF THE RELATED ART

Conventional software development and distribution models have involved development of an executable software application, and distribution of a computer-readable medium, such as a CD-ROM, to an end user. Upon receipt of the computer-readable medium, the end user executes installation files stored on the CD-ROM to install the executable software application on the user's personal computer (PC), etc. When the software is initially executed on the user's PC, the application may be further configured/customized to recognize or accept input relating to aspects of the user's PC, network, etc., to provide a software application that is customized for a particular user's computing system. This simple, traditional approach has been used in a variety of contexts, with software for performing a broad range of different functionality. While this model might be satisfactory for individual end users, it is undesirable in sophisticated computing environments.

Today, most corporations or other enterprises have sophisticated computing systems that are used both for internal operations, and for communicating outside the enterprise's network. Much of present day information exchange is conducted electronically, via communications networks, both internally to the enterprise, and among enterprises. Accordingly, it is often desirable or necessary to exchange information/data between distinctly different computing systems, computer networks, software applications, etc. The enabling of communications between diverse systems/networks/applications in connection with the conducting of business processes is often referred to as "business process integration." In the business process integration context, there is a significant need to communicate between different software applications/systems within a single computing network, e.g. between an enterprise's information warehouse management system and the same enterprise's SAP® purchase order processing system. There is also a significant need to communicate between different software applications/systems within different computing networks, e.g. between a buyer's purchase order processing system, and a seller's invoicing system.

Relatively recently, systems have been established to enable exchange of data via the Internet, e.g. via web-based interfaces for business-to-business and business-to-consumer transactions. For example, a buyer may operate a PC to connect to a seller's website to provide manual data input to a web interface of the seller's computing system, or in higher volume environments, a buyer may use an executable software application known as EDI Software, or Business-to-Business Integration Software to connect to the seller's computing system and to deliver electronically a business "document," such as a purchase order, without requiring human intervention to manually enter the data. Such software applications are readily available in the market today. These applications are typically purchased from software vendors and installed on a computerized system owned and maintained by the business, in this example the buyer. The seller will have a similar/complementary software application on its system, so that the information exchange may be completely automated in both directions. In contrast to the present disclosure, these applications are purchased, installed and operated on the user's local system. Thus, the user typically owns and maintains its own copy of the system, and configures the application locally to connect with its trading partners.

In both the traditional and more recent approaches, the executable software application is universal or "generic" as to all trading partners before it is received and installed within a specific enterprise's computing network. In other words, it is delivered to different users/systems identical, generic form. The software application is then installed within a specific enterprise's computing network (which may include data centers, etc. physically located outside of an enterprises' physical boundaries). After the generic application is installed, it is then configured and customized for a specific trading partner after which it is ready for execution to exchange data between the specific trading partner and the enterprise. For example, Walmart® may provide on its website specifications of how electronic data such as Purchase Orders and Invoices must be formatted for electronic data communication with Walmart®, and how that data should be communicated with Walmart®. A supplier/enterprise is then responsible for finding a generic, commercially-available software product that will comply with these communication requirements and configuring it appropriately. Accordingly, the software application will not be customized for any specific supplier until after that supplier downloads the software application to its computing network and configures the software application for the specific supplier's computing network, etc. Alternatively, the supplier may engage computer programmers to create a customized software application to meet these requirements, which is often exceptionally time-consuming and expensive.

SUMMARY OF THE DISCLOSURE

The present disclosure provides a system and method for on-demand creation of a customized software application in which the customization occurs outside of an enterprise's computing network. Thus, the software application is customized for a specific enterprise before it arrives within the enterprise's computing network, and is delivered to the destination network in customized form. Consistent with the present disclosure, an employee within an enterprise can connect to a website and use a specially-configured graphical user interface to visually model an "integration process" via a flowcharting process, using only a web browser interface. During this modeling process the user selects from a predetermined set of process-representing visual elements that are stored on a remote server, such as the web server. By way of example, the integration process could enable a bi-directional exchange of data between its internal applications, between its internal applications and its external trading partners, or between internal applications and applications running external to the enterprise. Applications running external to the enterprise are commonly referred to as SaaS "Software as a Service".

The user of the website then downloads and installs a container program, also referred to herein as a "dynamic runtime engine," which is an executable software application capable of running on a computer within the enterprise's network, which may include, for example, networks owned and/or operated by third party data center providers, such as OpSource, Amazon, etc. When started by the user, this executable software application connects to the website and downloads an XML representation of the visual model representing the integration process, and all requisite code needed to run the integration process. The required code includes a "stock" or generic application template, selected predefined "stock" codesets that are selected as a function of the user's needs as defined by the modeled process, and a data codeset that includes input provided by the user for customizing the stock components for a specific integration process. Additional components may be retrieved as required.

As changes are made to this model, via the website, or to the code that executes the model, the executable software application will automatically check for and apply these changes as needed without requiring human intervention.

Each integration process represents a complete end-to-end interface. For example, a process could be modeled to accept a purchase order (PO) from a retailer such as Walmart®, transform the PO into a format recognizable by a certain internal order management software application of the enterprise, and then insert the contents of that PO directly into the enterprise's order management system.

BRIEF DESCRIPTION OF THE DRAWINGS

The present disclosure will now be described by way of example with reference to the following drawings in which.

DETAILED DESCRIPTION

The present disclosure provides a system and method for on-demand, real-time creation of a customized executable software application that is automatedly created from a plurality of pre-existing "stock" components and data provided by a user that relates to a specific enterprise/integration process. The creation and customization occurs outside of an enterprise's computing network, e.g. at a centralized network-accessible server/system. Accordingly, the customized software application is configured for a specific enterprise's activities, business processes and/or computing network (collectively, "integration process") before it is received within that enterprise's computing network.

The present disclosure provides conventional application integration and B2B (business-to-business) integration capability, but involves a novel manner of creating and/or configuring software for doing so, i.e. by providing a web browser application for a building a visual model for an integration process, instead of using a locally-installed application to build the integration processes. Further, the user can then download, install, run a dynamic runtime engine software application which will download the corresponding code needed to execute the integration process. This is in contrast to traditional methods which entail installing one server application on the user's local system, and then saving the integration processes to the server application.

Figure 1:
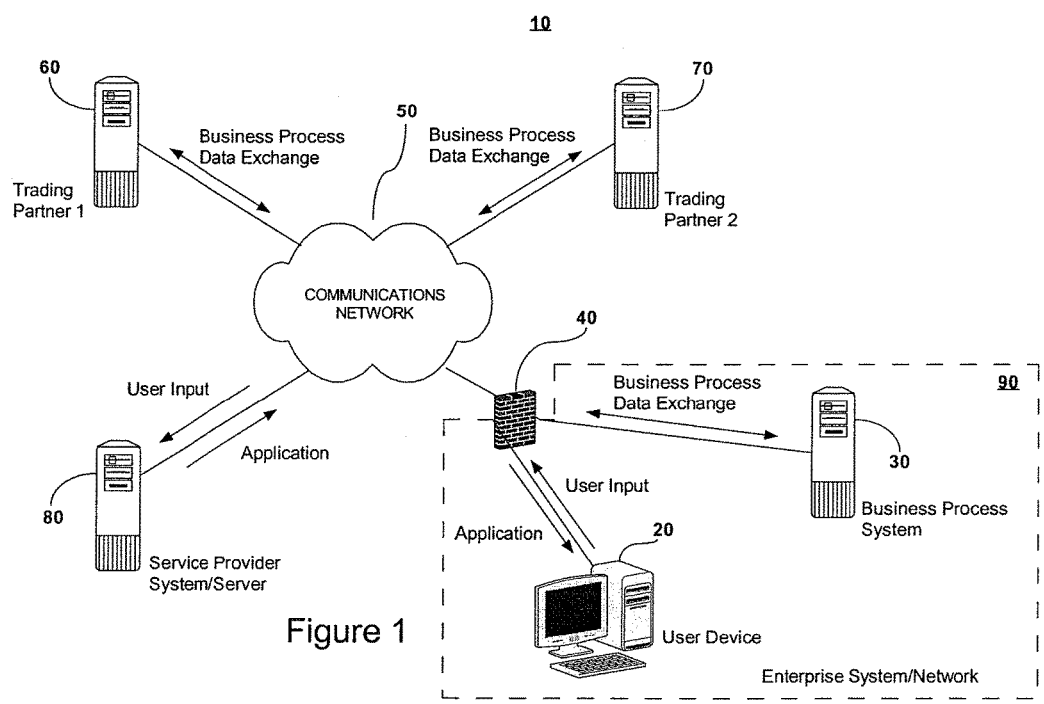
FIG. 1 is a block diagram showing diagrammatically a system in accordance with the present disclosure.

For illustrative purposes, an example provided in the context of development and distribution of business integration software is discussed below with reference to FIGS. 1-4. FIG. 1 is a block diagram showing diagrammatically a simplified network 10 in accordance with the present disclosure. Actual network topology should be expected to be significantly more complex. As shown in FIG. 1, the exemplary system includes conventional computing hardware of a type typically found in client/server computing environments. More specifically, the network 10 includes a conventional user/client device 20, such as a conventional desktop PC, enabling a user to communicate via a communications network 50, such as the Internet. The exemplary user device 20 is configured with conventional web browser software (any web browser that is capable of supporting Adobe's Flash runtime environment), such as Microsoft Corporation's Internet Explorer web browser software, for interacting with websites via the network 50. The exemplary client device 20 is positioned within an enterprise network 90 behind the enterprise network's firewall 40, which is of a conventional type. For illustrative purposes, the enterprise network 90 includes a business process system 30, which may include conventional computer hardware and commercially available business process software, such as QuickBooks®, SAP's® MySAP ERP, Oracle's® OneWorld JD Edwards ERP, Infor's WMS application, or many others.

The exemplary network 10 further includes conventional hardware and software providing trading partner systems 60, 70 for receiving and/or transmitting data relating to business-to-business transactions. Such systems are conventional and well-known in the art. For example, Walmart® may operate trading partner system 60 to allow for issuance of purchase orders to suppliers, such as the enterprise, and to receive invoices from suppliers, such as the enterprise, in electronic data form as part of electronic data exchange processes of a type well known in the art.

It should be noted from the description above that the system/network components described are thus conventional in nature with respect to electronic exchange of data/information in a business process integration context. As described above, in a conventional arrangement, the enterprise's business process system 30 might communicate directly with a trading partner's system 60 to exchange data. Due to the cost and complexity of enabling this electronic exchange, many enterprises have avoided this arrangement, and instead continue to use manual processes to exchange business documents, such as by telephone or fax. The present disclosure allows an enterprise to obtain the capabilities needed to conduct the electronic exchange of data with one or more trading partners, internal applications, or applications available via the Internet, commonly referred to as SaaS (Software as a Service). The present disclosure provides these capabilities in a unique fashion by providing the enterprise with a software application including the configuration information required for conducting the integration process, and also the executable code needed to make the process run, and specially configuring this application to run within the enterprise's network, e.g., behind the firewall of the enterprise or within a third-party-hosted data center, etc. considered to be part of the enterprise's network, so that it may connect to various software applications running internal to the enterprise's network.

Figure 2:
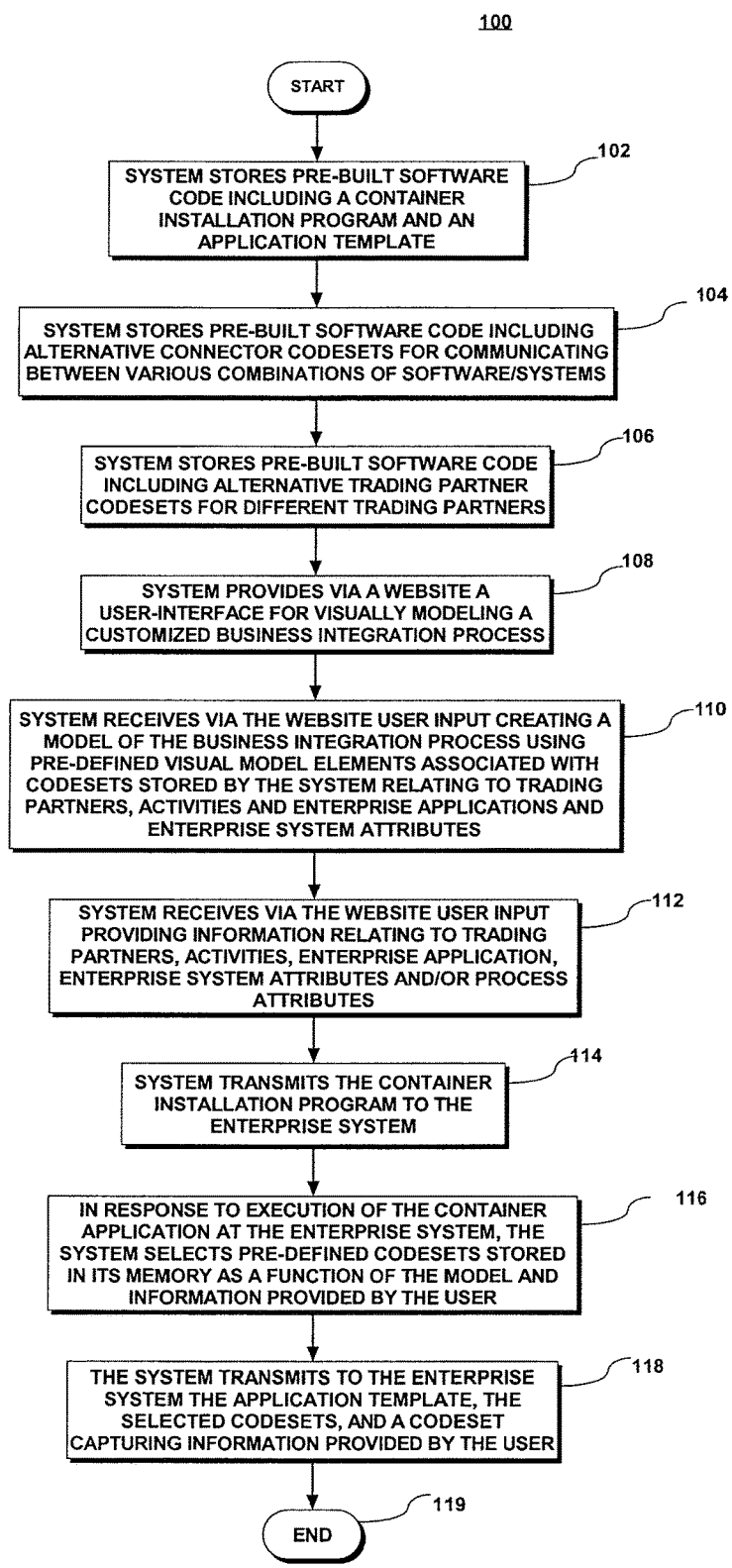
FIG. 2 is a flow diagram illustrating an exemplary method for automated, on-demand creation of a customized software application in accordance with the present disclosure, shown from the system's perspective.

In accordance with the present disclosure, a provider of a service ("service provider") for creating on-demand, real-time creation of customized software applications operates a service provider server/system 80 within the network 10. The system 80 is specially configured in accordance with the present disclosure, and is capable of communicating with devices in the enterprise's network 90. It should be noted that the communication between system 80 and network 90 is essentially uni-directional in that communications/communication sessions originate from network 90 to system 80, and not from system 80 to network 90. Accordingly, the network 90 need not have its firewall 40 modified to allow incoming traffic from communications sessions originating from system 80. FIG. 2 is a flow diagram illustrating an exemplary method for automated, on-demand creation of a customized software application, as viewed from the perspective of system 80.

More specifically, the present disclosure provides that the service provider system 80 is specially-configured in accordance with the present disclosure to store certain pre-defined, i.e. pre-built, datasets in its memory. Such data includes a pre-defined container (also referred to herein as a "dynamic runtime engine") installation program that is executable at the enterprise system to install a pre-defined dynamic runtime engine application, as shown at step 102 of FIG. 2. The dynamic runtime engine application is executable at the enterprise system 90 to download from the server 80 an application template. The application template is preferably provided in the form of an XML representation of the execution steps to be carried out by the customized software application, which in this example provides business process integration functionality, as modeled by the user, using a provided graphical user interface. The application template includes references to specific pre-built software code stored on the service provider system 80, and how the pre-built code should be configured for execution within an enterprise's computing network, or other network of choice, to provide for exchange of business integration data between the enterprise's computing system(s) within the enterprise's network, and/or between the enterprise's computing system(s) and trading partners' systems external to the enterprise's network, and/or between the enterprise's internal computing system(s) and the enterprise's computing systems external to the enterprise's network, commonly referred to as SaaS (Software as a Service). For example, the application template may be constructed as an integration of customer data between Salesforce® and SAP® using JAVA® programming technology. Optionally, one or more application templates are predefined and stored by the server, e.g. for various different types of integration processes.

The application template is corresponds to the modeled integration process, but is not itself configured for use with any particular enterprise, or any particular trading partner. Accordingly, the application template is not yet ready for execution to provide business integration functionality for any particular trading partner or enterprise. Instead, the application template requires additional code and/or data to be so configured. Preferably, the application template has a conceptual design that is modular in nature, and thus permits it to function with any selected ones of several different additional components, as discussed below. The dynamic runtime engine installation program, the dynamic runtime engine program and the application template may be used by different enterprises/customers of the service provider.

Such pre-built software code includes Connector codesets, as shown at step 104 of FIG. 2. Each Connector codeset includes code for communicating with a specific software application or system. For example, the Connector codesets may be stored, e.g. in a database, as a combination of executable software code and XML containing configuration information about the usage of the Connector codeset. Each Connector codeset is configured to provide connectivity to specific software applications, databases and/or systems. Each Connector codeset is specially configured to enable communication with the application, etc. in the proprietary API (Application Programming Interface) utilized by that application and/or system.

Such pre-built software code further includes Data Profile codesets. A data profile is needed specifically when the data being sent/received must be parsed, have its contents examined programmatically, or otherwise be processed by the container application, such as when data is routed based on the value of a particular field, or when a piece of data is transformed from an XML format (for example) to a Flat File format. For example, a Data Profile codeset may be stored, e.g. in a database, as a combination of executable software code and XML containing configuration information about the usage of the Data Profile codeset. For example, a Data Profile codeset may describe the originating format and structure of certain data to be integrated, the destination format and structure of such data, a data map for retrieving data from certain fields in a source document and inserting it into a certain field in a destination document, etc. For example, a Data Profile codeset may exist for a purchase order to indicate originating and destination formats of a particular purchase order, what the source document is, where certain data in the source document must appear in the destination document, etc. Each Data Profile codeset is associated with a specific data element to be integrated. The Data Profile codesets may be used by different enterprises/customers of the service provider.

Further, the Connector codeset is associated with a visual connector element that abstracts away the technical details of how this communication occurs, greatly simplifying the process of communicating with the target application or system. Accordingly, a user can visually configure the connector element, and the associated Connector codeset, by entering simple values into a dialog box within the application, thus avoiding a need to write computer code and understand the underlying proprietary protocol being used. This permits a layperson to use the application to create a customized software application, without the need for a computer programmer.

Preferably, a respective Connector codeset is provided for each commercially available and/or known software application/system. For example, there may be a Connector codeset for QuickBooks® software, another for a specific SAP® system, and another for Salesforce.com® CRM, which is a SaaS solution. It will be noted that these same Connector codesets may be used to communicate between different application software/systems within a single enterprise system, as discussed in greater detail below, or they may be used to insert or extract data for exchange with an external trading partner.

Accordingly, the Connector codesets are conceptually modular in that a corresponding Connector codeset may be selected for use in conjunction with the application template to provide a customized software application for exchanging data with specific software applications/systems. Further, the Connector codesets may be used by different enterprises/customers of the service provider.

Further, the present disclosure provides that the service provider system 80 is specially-configured in accordance with the present disclosure to store in its memory a Trading Partner codeset for each of several different trading partners, as shown at step 106 of FIG. 2. For example, the Trading Partner codesets may be stored, e.g. in a database or otherwise in a memory of the system 80, as various XML documents, each including respective data for each of a plurality of different trading partners. For example, there may be an XML document including information for communicating with Walmart's® trading partner system 60. The document may include respective communication parameters relevant for the respective trading partner, such as an identification of the IP protocol to be used for communication (such as HTTP), an applicable security standard to be complied with (such as AS2), an applicable URL or other network address information to be used for communication (such as http://www.walmart.com/as2), electronic data interchange (EDI) parameters, formats, etc. to be used (such as Interchange Id, Application Id, Primary and Secondary contact information, etc.), etc.

The Trading Partner codesets are conceptually modular in that any selected Trading Partner codeset, e.g. XML document, may be selected for use in addition to the application template to provide a customized software application for exchanging data with the trading partner. The Trading Partner codeset may be used by different enterprises/customers of the service provider.

The system 80 is further specially configured in accordance with the present disclosure to provide web server functionality for presenting a user-accessible website. Communications between the user device 20 and the system 80/website may be performed using conventional communications technologies, such as the HTTPS protocol.

The website is specially configured to provide a graphical user interface providing a visual designer environment permitting a user to define process flows between applications/systems, such as between trading partner and enterprise systems, to model a customized business integration process, as shown at step 108 of FIG. 2. The graphical user interface may be used by different enterprises/customers of the service provider.

The interface provides a menu of pre-defined user-selectable visual elements, and permits the user to arrange them as appropriate to model a process. The elements may include visual, drag-and-drop icons representing specific units of work required as part of the integration process, such as invoking an application-specific connector, transforming data from one format to another, routing data down multiple paths of execution by examining the contents of the data, business logic validation of the data being processed, etc. Information and computer executable instructions for presenting such a graphical user interface are stored in a memory of the service provider system 80.

This selection and arrangement of these elements by the user results in the system's receipt via the website of user input creating a model of the process, as shown at step 110.

Further, the graphical user interface allows the user to provide user input providing information relating to trading partners, activities, enterprise applications, enterprise system attributes, and/or process attributes that are unique to a specific enterprises end-to-end business integration process. For example, the graphical user interface may provide drop down or other user-selectable menu options for identifying trading partners, application connector and process attributes/parameters/settings, etc, and dialog boxes permitting textual entries by the user, such as to describe the format and layout of a particular data set to be sent or received, for example a Purchase Order. The providing of this input by the user results in the system's receipt via the website of such user-provided information as a data codeset, as shown at step 112.

XML representations of the model and the information provided by the user are stored by the system 80 in association with the user's/enterprise's account. This allows this information to be stored, retrieved, modified, transmitted, etc. It should be noted that information provided by the user that relates to the enterprise system may optionally be saved by the system 80 for subsequent use by the user in modifying the customized application software, or for developing customized application software for integrating other business processes. It should further be noted that trading partner data not previously stored by the system may be gathered by prompting the user to supply such information via the website interface, and that such gathered information may subsequently be saved by the system 80 for subsequent use by the same or other users.

Figure 5:
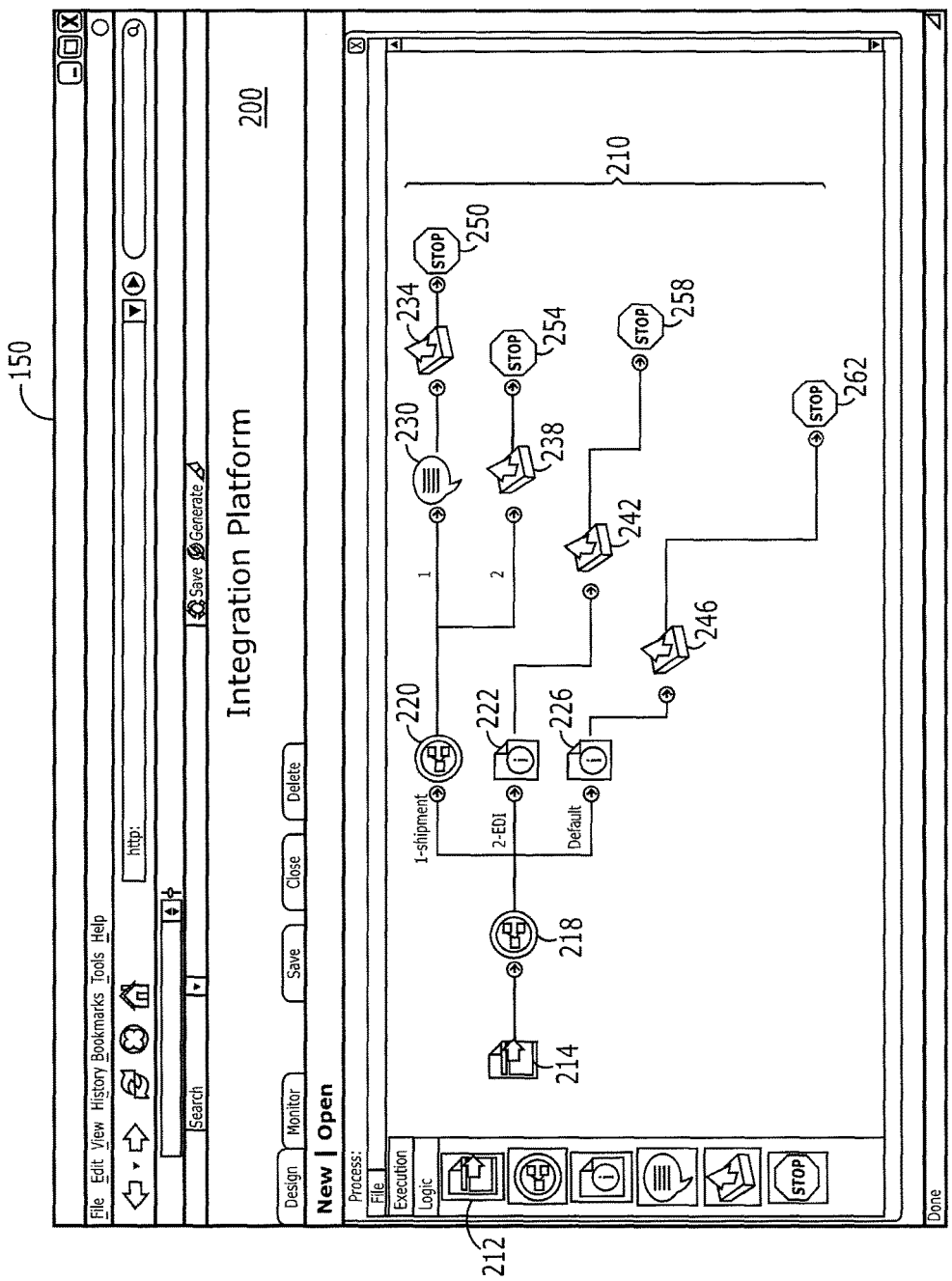
FIG. 5 is an image of an exemplary graphical user interface showing an exemplary visual model of an exemplary business process.

By way of illustrative example, the website interface may provide a visual menu of elements in a drag-and-drop environment permitting the user to create a visual model of business process activities desired to be handled by the customized software application. For example, this may involve a user's identification of receipt of purchase orders as an activity, or of issuance of invoices as an activity. By way of illustrative example, FIG. 5 shows a graphical user interface 200 displayed within a web browser window 150. The exemplary graphical user interface 200 displays an exemplary business process integration model 210 in the form of a flow diagram modeling a shipment order business process. The visual model is created by a user within the visual designer environment, via the website interface provided by the system 80.

The exemplary flow diagram of FIG. 5 includes exemplary Inbound connector element 214, Routing process elements 218, 220, Document Property elements 222, 226, Data Transformation process element 230, and Outbound connector elements 234, 238, 242, 246, and Process End elements 250, 254, 258 and 262. Various ones of these elements are selected from a menu 212 of elements and arranged by the user relative to one another as appropriate to model a corresponding business process. The elements may require data input from a user. For example, the inbound connector element 214 selected from the menu by the user may be configured by the user for a specific enterprise and process by the user's selection of the element and completing dialog boxes, selecting menu items, etc. as appropriate. For example, the user may provide as input for configuring data entry element 214 that the data will be inbound from a SAP® system. This may be performed via a data entry field displayed in the window upon selection of data entry element 214. The element, in combination with any required data input, is associated with a specific Connector codeset stored in the memory of the system 80. The outbound connector elements may be similarly configurable. For example, the last step of the integration process may involve sending shipping order data to the SAP® system. The Shipping Order will be prepared as an XML message, which is a readily recognizable format. The XML message is then sent to the outbound connector, and the outbound connector converts the XML message from this simple, recognizable format into the proprietary format that is understood by the SAP® system. This conversion, and the need for it, is transparent to the user configuring the integration process.

By way of further example, the routing element may require input for routing logic to be applied, the Document Properties element may require input for file naming file storage location, etc. to be applied, etc. There may be other elements as appropriate or necessary for modeling business processes, as desired.

Each branch of the flow diagram represents an end-to-end business process to be integrated. In the example of FIG. 5, the first (top-most) branch may model a process involving receipt of data from a SAP® system in a corresponding format, routing the data according to prescribed logic (e.g., 1=shipment), further routing according to further logic (e.g., 1), transforming the data from the SAP® system format to the destination system format by Data Transformation process element 230 to create an appropriately formatted XML document, and then transmitting the transformed data to the destination system in accordance with the properties and attributes of the outbound application connector 234.

Examples of other common activities include synchronizing customer data between applications, synchronizing product information between applications, notification of receipt of goods ordered by a retailer, receipt of a work related injury claim, and many others.

As referenced above, the website interface may provide menus, dialog boxes or other input-receiving fields or devices permitting textual or other entries by the user to provide information, parameters, settings, attributes, etc. that are specific to a certain enterprise, trading partner, process, etc., e.g. as adding them as properties or attributes of one of the visual modeling elements. For example, a user modeling an integration process for receiving purchase orders may select an outbound connector element, and then provide input for the outbound connector element to identify a specific software application within the enterprise that should receive purchase order data the enterprises' unique system parameters such as a hostname for the purchase order processing application, a valid username and password for use of the purchase order processing system, port listings for receiving/posting data, etc.

This modeling by the user results in the system's receipt via the website of user input modeling business processes to be integrated, and user input providing information relating to specific trading partners, the enterprise, the process, etc. Accordingly, the system is aware of the applications on both the source and destination ends, in this example the trading partner and enterprise ends, and parameters for automating the business process, and can use this information to dynamically and automatically create a customized software application for integrating the modeled business process.

The system 80 subsequently, e.g. after storing the completed model, transmits the dynamic runtime engine installation program stored in its memory to the enterprise system 90, e.g. user device 20, as shown at step 114. As discussed above, execution of the dynamic runtime engine installation program within the enterprise network 90, e.g. at user device 20, installs an executable dynamic runtime engine application on the user device. When the dynamic runtime engine application is executed, it initiates communication with the system 80.

In response to execution of the dynamic runtime engine application at the enterprise network 90, the system 80 selects pre-defined codesets stored in its memory that will be required by the enterprise system to automatedly execute the modeled integration process, as shown at step 116. The system 80 selects codesets from all codesets stored in its memory as a function of the model, i.e. the elements selected by the user in creating the model, and as a function of the parameter/setting, etc. information provided by the user in step 112.

For example, if the user has modeled a process by selecting inbound connector 214 in step 110, and the user has provided data identifying trading partner Z will provide the inbound data represented by inbound connector 214, then the system 80 will select the Connector codeset associated with an inbound connector, and the Trading Partner codeset associated with trading partner Z, and Data Profile(s) that correspond to the activities and/or data being exchanged with trading partner Z. It may be known from the data provided by the user or from the Trading Partner codeset that the incoming data will be coming from software application A. Accordingly, the system may further select a codeset relating to use of software application A, and/or any other codesets stored in the memory of system 80 that are referenced by a codeset it has already selected.

This allows the system 80 to determine which pre-built software components (XML documents) are needed for the final executable software application. For example, if the user has created a model including inbound connector 214, and configured inbound connector 214 to specific that the inbound data will be coming from a SAP® system, the system is configured to identify a corresponding pre-built Connector codeset stored in its memory that is required for receiving data from the SAP® system.

For example, an integration process may be modeled that uses an AS2 application connector element, which is associated with an AS2 Connector codeset required for communicating with the systems of many retailers such as Walmart, and this same process could also utilize a database connector, because the enterprise has developed a database where data received from Walmart® is to be stored. In this example, the integration process could be modeled to receive Purchase Orders from Walmart®. It may contain several steps, such as (1) invocation of the AS2 application connector as described above for securely receiving the incoming data from Walmart®, (2) a data transformation step to transform the data from Walmart's® format to a format recognizable by the internal database system, and (3) an invocation of the Database Connector to deliver the purchase order to the database system.

Accordingly, the system 80 receives via the website user input allowing the system 80 to search its database and select from various pre-stored code only those selected codesets, data, application templates, etc. required to build a customized software application for automatedly integrating the modeled business process. The appropriate application template may be selected as a function of the process modeled by the user. When the selected codesets are combined with the selected application template and the user information codeset, they collectively provide an executable customized software application for automatedly integrating the modeled business process.

The system then transmits to the enterprise network 90, e.g. the user device 20, the generic executable application template stored in its memory, the codesets selected in step 116, and a codeset capturing the information provided by the user in step 112, as shown at step 118.

In the example of FIG. 1, the application may be received and stored by either device 20 or business process system 30. The application, whether executed at the user device 20 or business process system 30, is then operable to exchange data between the business process system 30 and a trading partner's system 60. For example, the process may be scheduled to execute periodically, e.g. every night, every 2 hours, etc., to exchange data.

Examples of data to be exchanged using the software include: receipt of purchase orders from a trading partner system 60, issuance of invoices to a trading partner system 60, issuance of an advance shipment notice to system 60, or many others. Any information that is communicated between organizations in a high volume and redundant manner is a candidate to be automated using integration software such as this. Numerous software applications exist today that can enable these types of automated exchanges. However due to the complexity of the setting up these processes, capabilities such as this are typically in the domain of larger enterprises with more sophisticated IT capabilities. Smaller organizations are therefore negatively impacted by not being able to participate in automated exchanges such as this, and are forced to pay exorbitant fees to outsourced EDI providers, or avoid automating these processes at all, and instead continue to use people-centric processes such as phone/fax/email for exchange this information. Further, as software applications known as Software as a Service or SaaS continue to emerge and gain popularity, enterprises need to integrate their internal applications with these applications hosted by the SaaS provider. Again integrating these systems is complex and expensive, requiring expensive consultants to setup and implement. The present disclosure opens a new window of opportunity for tech savvy employees of smaller enterprises to now participate in the benefits of integration. The present disclosure makes this possible by changing the technical capabilities and requirements of setting up, deploying and maintaining integration processes. Using only a web browser a user can automate integration processes for a specific enterprise, and then download the dynamic runtime engine application containing just the enterprise-specific processes and run this dynamic runtime engine on the enterprise's existing infrastructure.

The dynamic runtime application is a very "lightweight" application because unlike other "static" software applications, the dynamic runtime engine is able to install just the software components that are needed to execute the integration processes for a particular enterprise. Conventional integration server software applications have been distributed as a pre-built application on a series of CD's, where it must be manually installed, and manually upgraded as new versions are made available by the software vendor.

Figure 3:
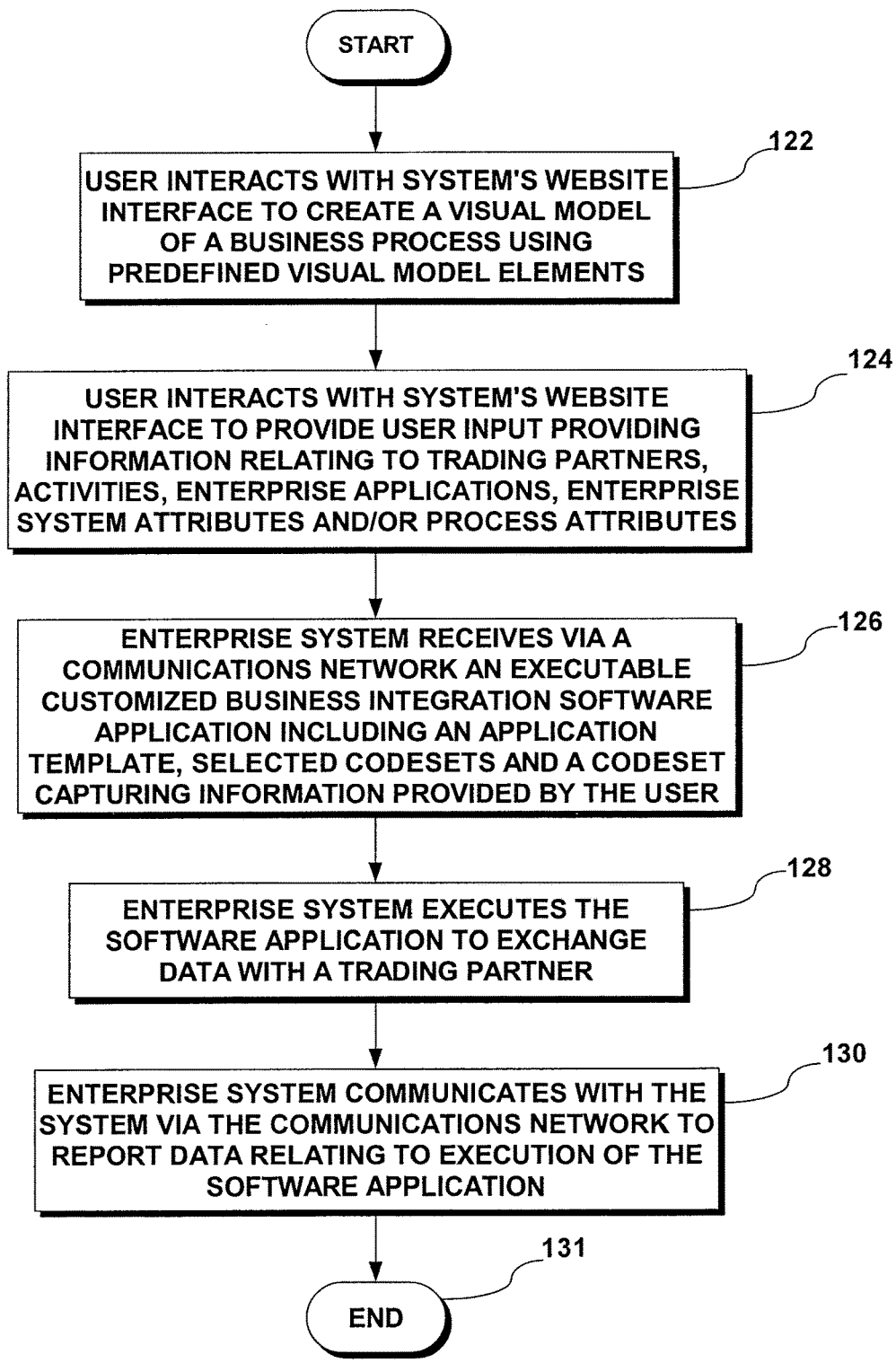
FIG. 3 is a flow diagram illustrating an exemplary method for automated, on-demand creation of a customized software application in accordance with the present disclosure, shown from a user's perspective.

FIG. 3 is a flow diagram 120 illustrating an exemplary method for automated, on-demand creation of a customized software application in accordance with the present disclosure, shown from a user's perspective. As shown in FIG. 3, the method begins with the user's use of the user device 20, etc. (FIG. 1) to interact with the website interface of the system 80, as shown at step 122. The user can interact with the website using Microsoft's Internet Explorer or a similar web browser, and conventional hardware/software for browsing and interacting with websites. The user interacts with the website to build a visual model of business process activities to be automated by selecting predefined business process elements from a menu of generic business process elements displayed via the interface, as described above.

Further, the user interacts with the website to provide user input providing enterprise-specific or process-specific parameters, settings, data, attributes, etc. for customizing the generic business process element to the specific business process of a specific enterprise, as discussed in greater detail above, as shown at step 124.

The user can continue to utilize system 80 to create new integration processes, and can deploy the integration process to the same dynamic runtime engine previously installed, or setup a new dynamic runtime engine for the new integration process to be downloaded and installed in.

After the integration process has been modeled to meet the requirements of the enterprise, the enterprise system receives via the network a dynamic runtime engine installation program, download of which is initiated by the user. Upon execution of the installation program by the user, a dynamic runtime engine application is installed. Execution is initiated in a conventional manner, e.g., by invoking a Start command from the menu of the operating system where the installation program has been installed. This application is installed by the user in the same network 90 in which the applications to be integrated reside.

Upon execution of the dynamic runtime engine program within the user's network (e.g. at user device 20 or business process system 30), the dynamic runtime engine connects to the service provider system 80 via the network 50, and initiates download of software components from the system 80 that collectively will provide an executable customized process-specific automated business integration software application. More specifically, the dynamic runtime engine initiates transmission from the system 80 to the enterprise network 90 (e.g. device 20) of the generic application template and the codesets that have been selected (see FIG. 2, step 116) because they are associated with the elements of the model built by the user, or are referenced by the codesets associated with the elements of the model. Further, the dynamic runtime engine initiates transmission from the system 80 to the enterprise network of a codeset capturing enterprise/process-specific information provided by the user (see FIG. 2, step 118), e.g. to configure the generic elements with enterprise/process-specific parameters, attributes, settings, etc. These software components are transmitted from the system 80 into the enterprise system, i.e., to a destination within the enterprise system, e.g. behind the enterprise system's firewall 40, e.g. to user device 20 or business process system 30. These software components may be transmitted in the form of one or more data files using conventional file transfer technologies, such as HTTPS or FTP.

Accordingly, the dynamic runtime engine downloads to the enterprise's network XML documents including the attributes, settings parameters, etc. provided by the user when modeling the process, which are captured by the application template and the appropriate connector, trading partner and/or data profile codesets for a specific integration process. For example, this may include the trading partner attributes of the partner being connected to, data transformation rules, data format layouts, business logic rules, specific error handling routines, etc. The enterprise network receives this data, as shown at step 126.

At this point the software components collectively provide the customized software application are ready for execution to exchange data. The application may run in an automated manner without requiring any human intervention.

The enterprise system then executes the customized software application, e.g. by executing the application template, as shown at step 128. Accordingly, when the application template is executed, the combination of the application template, the downloaded pre-built XML documents corresponding to the process modeled by the user, and the XML documents capturing user input provided during modeling of the process, are executed to provide a customized business process integration software application.

When the dynamic runtime engine executes a particular customized integration process, the enterprise system 90 transmits and/or receives data, in this example with the trading partner's system 60. For example, Purchase Order data may be retrieved by the integration process out of system 30, where it is transformed during execution of the integration process into the format required by system 60, and is then transmitted to the trading partner's system 60 via the communications network 50. In turn, the trading partner's system 60 receives this data using their own EDI integration software. This and other types of exchanges are of a conventional nature and are well known to those skilled in the art.

Subsequently, the customized software application will report the results of all processes executed as they complete to system 80, as shown at step 130. The user may then connect to system 80 using a web browser via a device such as system 20 to view the status of the dynamic runtime engine executions. Such information may include the status of a particular process execution (success, failure), how many documents were processed, how the long the process took to run, etc. Only reporting information is transmitted from the enterprise system to the service provider system 80, not the actual data being processed. This allows for reporting of errors, etc. to allow for customer support, troubleshooting, etc.

It should be noted, however, that the customized application may be configured to be "self-updating." More specifically, the dynamic runtime engine application is configured to check for components it requires to automate the modeled business process, and to automatically initiate download of any updated component on the server newer than a corresponding component resident at the enterprise network, thus updating the application. Accordingly, the dynamic runtime engine is configured to connect to system 80 to download both application settings for the application template as well as additional software components.

Further, the dynamic runtime engine application is configured to check for a new/revised model of a process, e.g. as a result of a user's operation of the system 80 to retrieve, modify and save a previously constructed business process model, and to retrieve any additional, new or modified components from the server that are newer than a corresponding component resident at the enterprise network, thus maintaining the application. Accordingly, as new versions of software components running inside the dynamic runtime engine are available, the dynamic runtime engine will download and apply those updates from system 80 without requiring any human intervention.

Accordingly, after the system 80 is initially established, the system 80 can be used repeatedly by a single enterprise to model and automate various different business processes, or by various different enterprises with various different enterprise system attributes, and each enterprise can model, and subsequently use, an appropriate customized software application that is custom-tailored to its specific needs. Further, such customized applications can be developed on-demand, as needed, in real time, and without the need for programmers or programmer expertise, etc. Instead, the system exists as a website accessible for use, essentially at will, subject to any applicable subscription, service level or other access restrictions.

It should be noted that the inventive method and system is not merely a conventional client/server arrangement. Instead, the software application to be executed within a specific enterprise system is custom-built using pre-built codesets selected as a function of user input, and user input, in view of specific enterprise system attributes, and is "pulled" from the system 80 by the dynamic runtime engine that is installed in system 20 or system 30. This requires the software application to be designed and built under the assumption that it will not be executed in the same network in which it was built.

It should be further noted that although the example above discusses "business-to-business integration" between applications of a trading partner system and an enterprise system in different networks, that the present disclosure is equally applicable to integrate between different applications within the enterprise system, i.e. for "application integration". For example, a customized business integration software application may be built as described herein for use among customer relationship management (CRM), inventory control, purchasing, accounting or other enterprise systems within the enterprise system network. Also, the present disclosure is equally applicable to integrate between applications within the enterprise system and applications running outside of the enterprise system, commonly referred to as SaaS or Software as a Service solution, i.e. for "SaaS integration". For example, a customized business integration software application may be built as described herein for storing customer information, and this data must be synchronized with a customer relationship management (CRM) application such as salesforce.com. Salesforce.com is not running in the network 90, and is instead accessible via the Internet.

Figure 4:
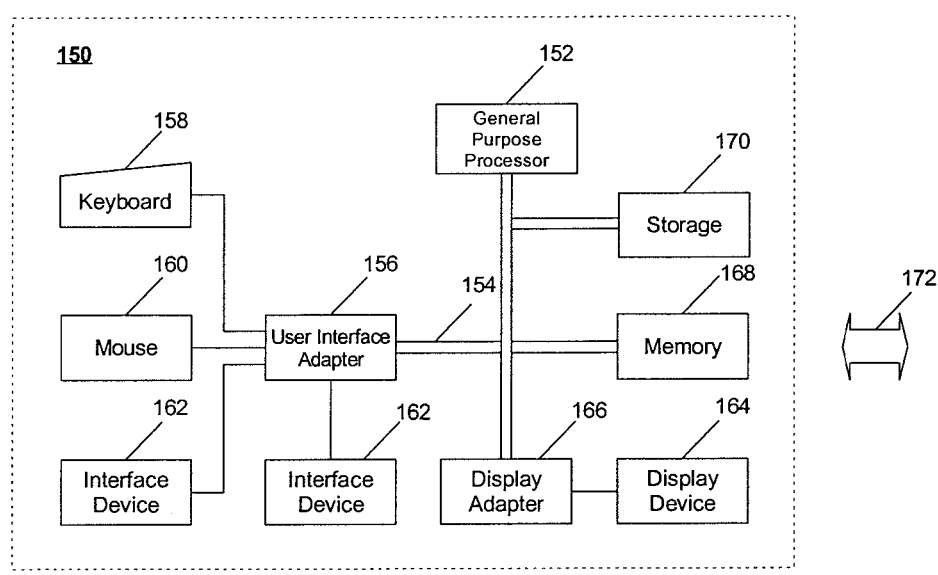
FIG. 4 is a block diagram showing diagrammatically an exemplary service provider server/system in accordance with the present disclosure.

FIG. 4 is a block diagram showing diagrammatically an exemplary server 150 in accordance with the present disclosure. As is well known in the art, the server of FIG. 4 includes a general purpose microprocessor (CPU) 152 and a bus 154 employed to connect and enable communication between the microprocessor 152 and the components of the server 150 in accordance with known techniques. The server 150 typically includes a user interface adapter 156, which connects the microprocessor 152 via the bus 154 to one or more interface devices, such as a keyboard 158, mouse 160, and/or other interface devices 162, which can be any user interface device, such as a touch sensitive screen, digitized entry pad, etc. The bus 154 also connects a display device 164, such as an LCD screen or monitor, to the microprocessor 152 via a display adapter 166. The bus 124 also connects the microprocessor 152 to memory 168 and long-term storage 170 (collectively, "memory") which can include a hard drive, diskette drive, tape drive, etc.

The server 150 may communicate with other computers or networks of computers, for example via a communications channel, network card or modem 172. The server 150 may be associated with such other computers in a local area network (LAN) or a wide area network (WAN). The server 150 may be a server in a client/server arrangement. All of these configurations, as well as the appropriate communications hardware and software, are known in the art.

Software programming code for carrying out the inventive method is typically stored in memory. Accordingly, server 150 stores in its memory microprocessor executable instructions. These instructions may include micro-processor-executable instructions stored in the memory and executable by the microprocessor to carry out any combination of the steps described above.

Also provided is a computer program product recorded on a computer readable medium for configuring conventional computing hardware to carry out any combination of the steps described above.

While there have been described herein the principles of the disclosure, it is to be understood by those skilled in the art that this description is made only by way of example and not as a limitation to the scope of the disclosure. Accordingly, it is intended by the appended claims, to cover all modifications of the disclosure which fall within the true spirit and scope of the disclosure.

What is claimed is:

1. An information handling system for preparing a visual model representing a specific integration process comprising:
    an interface device for receiving data representing a customized visual model of a specific integration process for transforming data to enable electronic data exchange between data formats formed by selectively associating a plurality of visual modeling elements selected from a menu of visual modeling elements in a graphical user interface window;
    the interface device for receiving data representing user input of data attributes unique to the specific integration process for at least one visual modeling element; and
    a processor for executing code to automatically generate a customized software end to end business integration application executable as an intermediary to perform the specific integration process that is based on the received customized visual model, wherein the customized software end to end business integration application transforms data formats to convert between incoming data formats and output data formats and enable electronic data exchange between differing incoming and outgoing data formats,
    wherein the customized software end to end business integration application executable to perform the integration process includes an application template specially configured to be executable with at least a connector code set and a trading partner code set corresponding to the visual modeling elements and a specific integration process data profile code set captured from the user input of data attributes unique to the specific integration process for at least one visual modeling element.

2. The information handling system of claim 1, wherein the graphical user interface window is configured to associate selected visual modeling elements in a flowchart.

3. The information handling system of claim 1, wherein the graphical user interface window further comprises a data entry element providing a data entry field configured to receive user input providing data attributes for at least one visual modeling element of the visual model.

4. The information handling system of claim 1, wherein the graphical user interface window further comprises a user-selectable option causing transmission of the data representing the customized visual model of the specific integration process to the information handling system.

5. The information handling system of claim 1, wherein the graphical user interface window further comprises a user-selectable option causing transmission to an enterprise system of data representing a specific visual model built by the user, the specific visual model representing a specific integration process.

6. The information handling system of claim 1, wherein the customized software end to end business integration application is configured to automatically check for updates to a code set for at least one visual modeling element.

7. The information handling system of claim 6, wherein the connector code set comprises data required for electronic communication in accordance with a specific application programming interface (API) and the trading partner code set comprising data required for electronic communication with a specific trading partner's system.

8. A method for automatedly generating a customized software end to end business integration application executable to perform an integration process via a customized visual model representing a specific integration process comprising:
    receiving, via an interface device, data representing a customized visual model of a specific integration process for transforming data to enable electronic data exchange between data formats formed by selectively associating a plurality of visual modeling elements selected from a menu of visual modeling elements in a graphical user interface window, wherein the customized software end to end business integration application acting as an intermediary that transforms data formats via data mapping between incoming data formats and output data formats to enable electronic data exchange between differing incoming and outgoing data formats;
    receiving user input of data attributes unique to the specific integration process for at least one visual modeling element;
    executing code, via a processor, to automatically generate a customized software end to end business integration application executable to perform the integration process that is based on the received customized visual model,
    wherein the customized software end to end business integration application executable to perform the integration process includes an application template specially configured to be executable with at least the connector code set and the trading partner code set corresponding to the visual modeling elements and a specific integration process data profile code set.

9. The method of claim 8, further comprising selectively associating the plurality of visual modeling elements selected from a menu of visual modeling elements in a flowchart.

10. The method of claim 8, further comprising providing a data entry field configured to receive user input providing data attributes for at least one visual modeling element of the visual model.

11. The method of claim 8, further comprising selecting a user-selectable option in the graphical user interface window to cause transmission of the data representing the customized visual model of the specific integration process to the information handling system executing code to automatically generate the customized software end to end business integration application.

12. The method of claim 8, further comprising a user-selectable option in the graphical user interface window causing transmission to an enterprise system of data representing a specific visual model built by the user, the specific visual model representing the specific integration process.

13. The method of claim 8, wherein the customized software end to end business integration application is configured to automatically check for updates to visual modeling element code sets.

14. The method of claim 13, wherein the trading partner code set comprising data required for electronic communication with a specific trading partner's system.

15. An information handling system for operating a dynamic runtime engine to execute a customized end to end business software integration application executable to perform a specific integration process comprising:
- an interface device for receiving an automatically generated customized software end to end business integration application based on a customized visual model representing a specific integration process to act as an intermediary for transforming data to enable electronic data exchange between data formats by selectively associating a plurality of visual modeling elements selected from a menu of visual modeling elements, wherein the customized software end to end business integration application transforms data formats between incoming data formats and output data formats to enable electronic data exchange between differing incoming and outgoing data formats;
- a processor executing the dynamic runtime engine for downloading a plurality of code sets including a connector code set and a trading partner code set corresponding to the visual modeling elements of the customized visual model; and
- the processor executing instructions of the downloaded plurality code sets corresponding to the visual modeling elements of the customized visual model to perform the specific integration process that is based on the customized visual model;
- wherein the customized software integration application executable to perform the integration process includes an application template specially configured to be executable with the code sets corresponding to visual modeling elements and an integration process data profile code set captured from user input of data attributes unique to the specific integration process for at least one visual modeling element.

16. The information handling system of claim 15, wherein the dynamic runtime engine is configured to automatically check for updates to visual modeling element code sets of the customized software end to end business integration application.

17. The information handling system of claim 15, wherein the connector code set comprises data required for electronic communication in accordance with a specific application programming interface (API).

18. The information handling system of claim 15, wherein the customized visual model representing a specific integration process for transforming data to enable electronic data exchange between data formats further comprises the selected visual modeling elements associated in a flowchart.

19. The information handling system of claim 15, wherein the dynamic runtime engine reports the results of all processes as they are completed by the customized software end to end business integration application.

20. The information handling system of claim 15, wherein the dynamic runtime engine reports the number of documents processed by the customized software end to end business integration application for one specific integration process execution.

\* \* \* \* \*